United States Patent [19]

Geary et al.

[11] 4,374,592
[45] Feb. 22, 1983

[54] VEHICLE TRANSPORTER

[75] Inventors: John Geary, Olney; David S. Johnson, Nr. Leighton Buzzard, both of England

[73] Assignee: Motorhouse Hire Limited, Buckinghamshire, England

[21] Appl. No.: 129,358

[22] Filed: Mar. 11, 1980

[30] Foreign Application Priority Data

Mar. 12, 1979 [GB] United Kingdom ............... 7908619

[51] Int. Cl.³ .............................................. B60D 7/02
[52] U.S. Cl. .......................... 280/476 R; 280/479 R; 280/43.13; 280/43.23; 280/686; 280/704; 280/714; 280/789; 414/495
[58] Field of Search ............... 280/43.13, 43.23, 6 R, 280/686, 717, 490 R, 492, 493, 494, 479 R, 475, 476 R, 656, 789, 704, 714, 82, 151, 760, 769; 414/481, 482, 483, 485, 495; 52/143; 296/181

[56] References Cited

U.S. PATENT DOCUMENTS

| | | | |
|---|---|---|---|
| 1,792,586 | 2/1931 | Higgins | 280/769 |
| 2,054,800 | 9/1936 | Adams | 280/769 X |
| 3,091,476 | 5/1963 | Blake | 280/43.23 X |
| 3,271,042 | 9/1966 | Flodin | 280/43.23 |
| 3,866,935 | 2/1975 | Nelson | 280/43.23 |
| 3,913,934 | 10/1975 | Koehn et al. | 280/656 |
| 4,003,583 | 1/1977 | Stanzel | 414/495 X |
| 4,101,158 | 7/1978 | Jones | 280/656 X |
| 4,119,224 | 10/1978 | Moody | 280/656 X |
| 4,206,934 | 6/1980 | McKee | 280/714 X |
| 4,216,977 | 8/1980 | Fujii | 280/714 X |

Primary Examiner—Robert J. Spar
Assistant Examiner—Donald W. Underwood
Attorney, Agent, or Firm—Lowe, King, Price & Becker

[57] ABSTRACT

A vehicle transporter is disclosed, for use in filming scenes in which characters are shown as occupying a moving vehicle, and in which the characters, and adjacent parts of the vehicle, appear in the foreground, and which transporter can also be used for straightforward transportation of such a vehicle by road.

The vehicle transporter comprises a low flat platform so contrived that the vehicle in question can readily be driven or wheeled onto it from behind, the transporter having at its front end a relatively raised structure, carrying castor wheels, and having a draw bar bearing a towing attachment. Adjustment means is provided whereby the level of the front of the platform relative to the towing attachment can be adjusted, and further wheels are carried by the platform, mid-way along the latter, at least one pair of which can also be adjusted in level relative to the platform, so that the platform can be placed very close to the road surface, for filming, in the interests of authenticity, and can be raised, for transportation, on public roads, to the level required by regulations and in the interests of safety.

6 Claims, 7 Drawing Figures

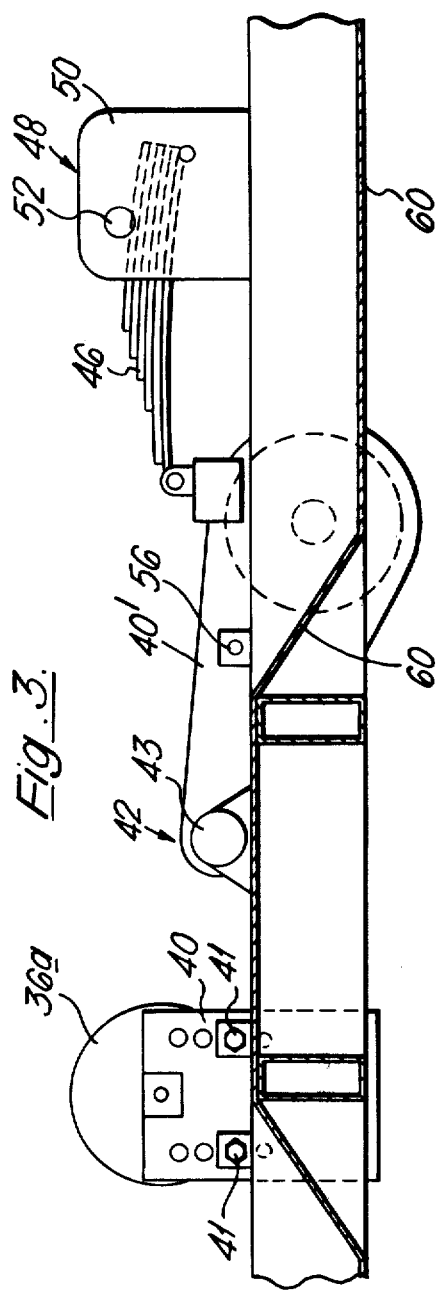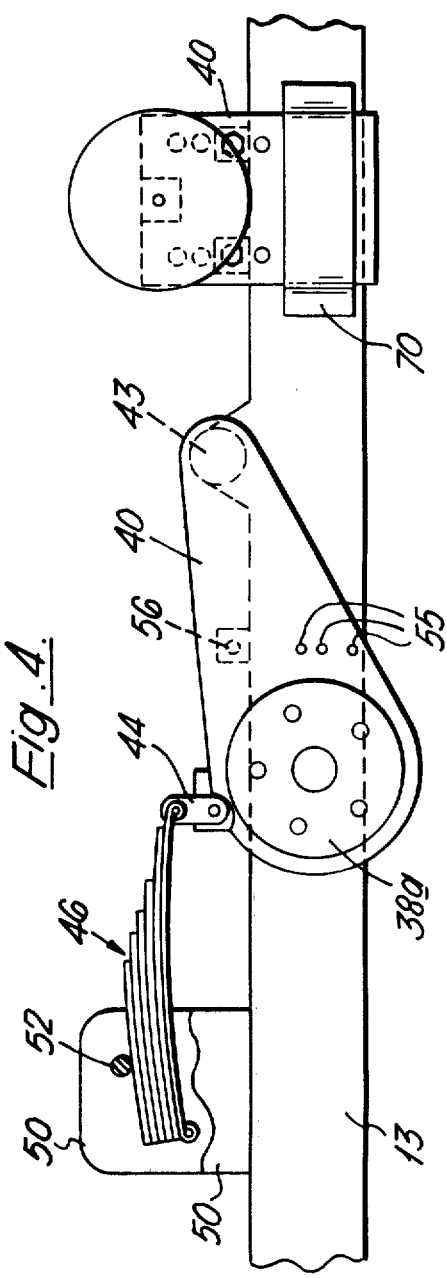

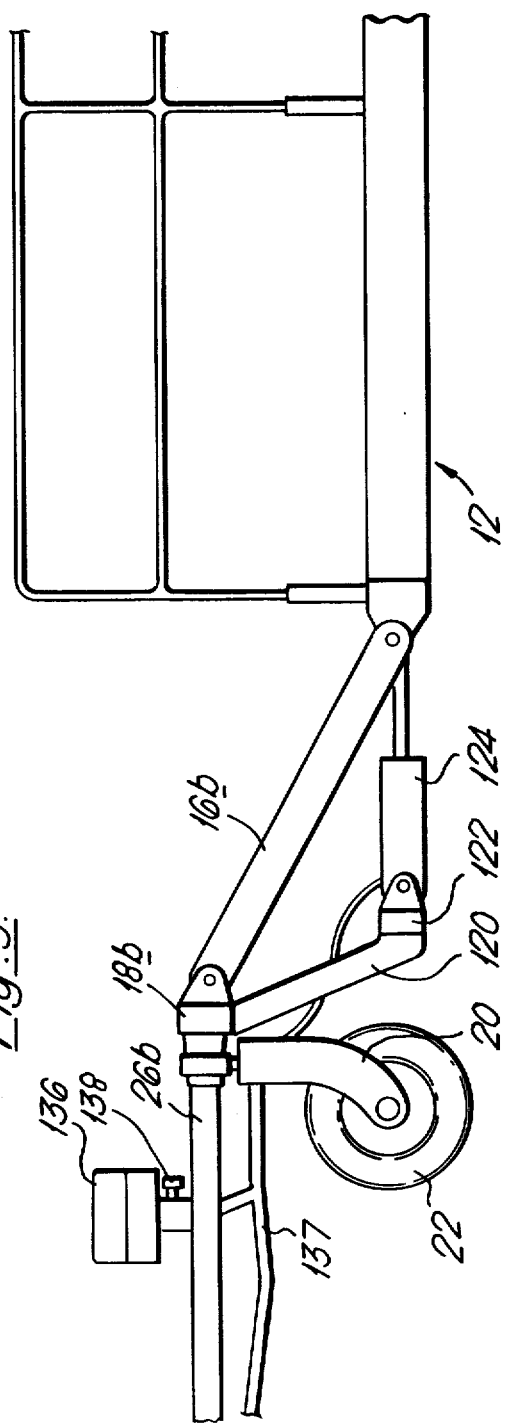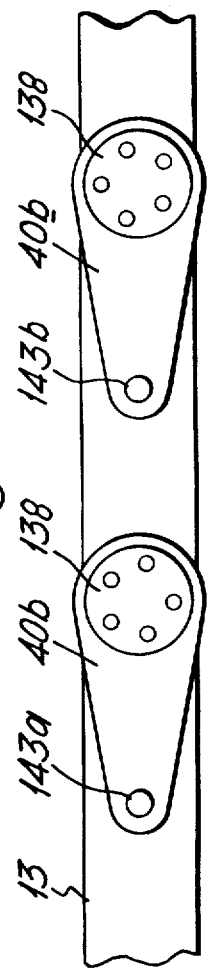

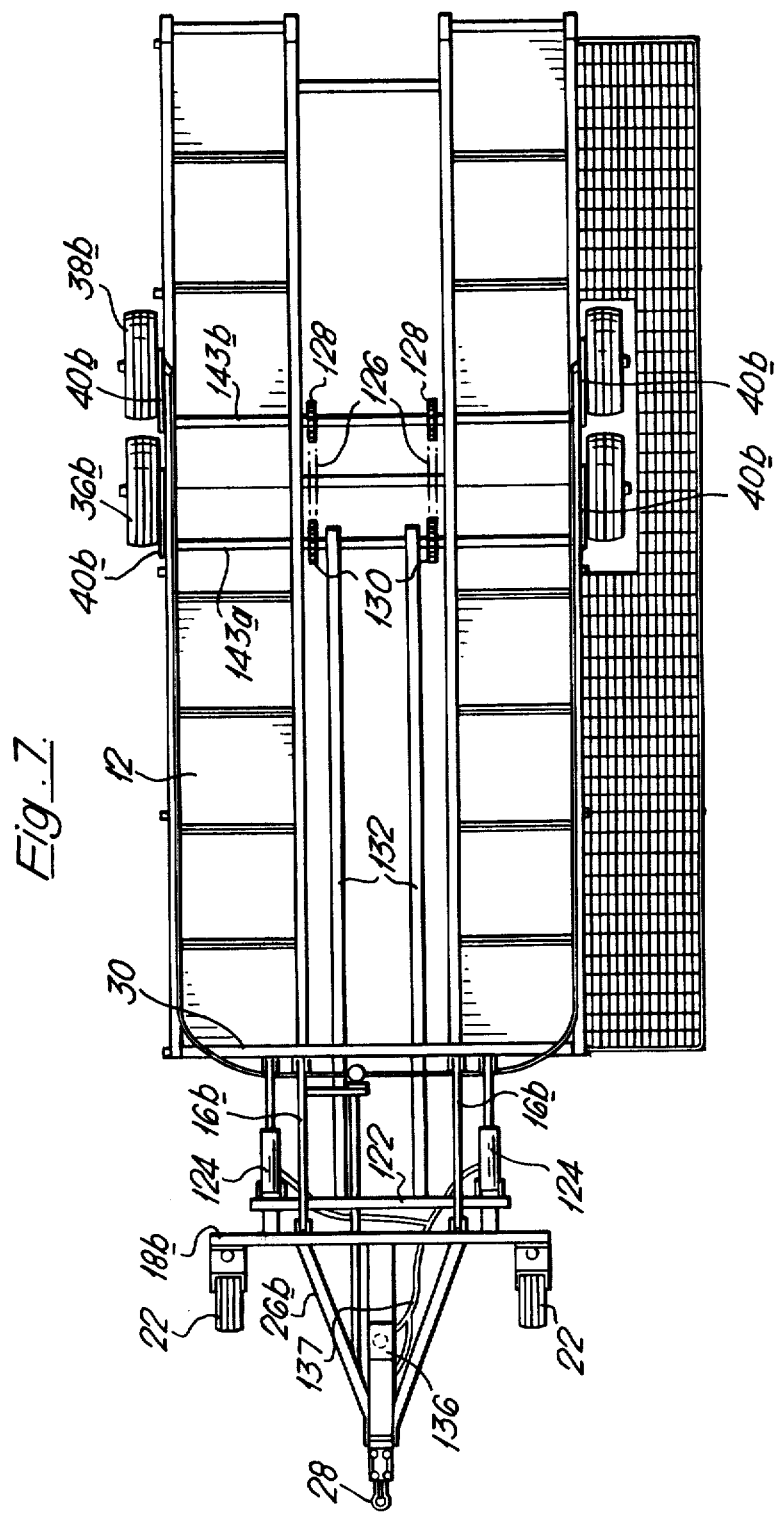

VEHICLE TRANSPORTER

This invention relates to a vehicle transporter.

It is frequently desired, in the making of moving pictures, for example cinematographic films, television video recordings, or the like to record scenes in which characters are shown as occupying a moving vehicle and in which the characters, and adjacent parts of the vehicle, appear in the foreground.

The apparently most straightforward method of recording such scenes, i.e. that of simply filming or recording actors occupying an operational vehicle as the latter is actually driven along a road, is normally rendered impracticable by various factors, such as difficulty in accommodating supports for cameras or cameramen, lights, sound recording equipment etc., at desired distances from the actors, on a normal road vehicle, particularly where one of the actors is required to appear to drive the vehicle, (without, however, being distracted by the demands of actual driving). It is therefore common to resort to artifice, for example, filming such scenes in the studio in a stationary mock-up, rendering the moving scenic background by, for example, back projection techniques. Nevertheless, the use of such artifices is detectable, if not obtrusive, in the finished product and furthermore, generally requires a fresh mock-up to be built for each production, with a consequent expense and loss of time, which may be significant, for example, in the production of television presentations an the like.

It is one object of the present invention to provide apparatus by means of which scenes of the character referred to can be filmed or recorded with the minimum of expense, evident artifice and loss of time, and which can also serve as a vehicle transporter.

According to the invention there is provided a vehicle transporter, providing a support structure for supporting the wheels of a vehicle to be transported, said structure itself being mounted on road-engaging wheels and an adjustment facility being provided whereby the support structure can be supported as desired, either at a higher level, for transportation, or at a lower level, such that the parts of said structure on which, in use, the wheels of the vehicle being transported rest are spaced relatively closely to the surface of the road engaged by the wheels of the transporter itself.

The transporter may have at least one pair of ground-engaging wheels connected with said structure via suspension means operable in one state to urge said wheels resiliently to a first level relative to said structure, said suspension means in another state thereof allowing said wheels to rise to a second higher level relative to said structure.

Preferably, the transporter may have at least one other pair of ground-engaging wheels connected with said structure and supported thereby, either rigidly or resiliently, substantially at said second, higher level.

The transporter may be provided with de-mountable cat-walks, supports for filming equipment or the like.

The transporter may be in the form of a trailer adapted to be towed behind a motor vehicle or may be self-propelled. An embodiment of the invention is described below with reference to the accompanying drawings.

In the drawings,

FIG. 3 is a view partly in longitudinal section and partly in side elevation, showing a detail of the transporter, the figure being somewhat diagrammatic and having parts omitted for clarity, and FIG. 4 is a side elevation view of the detail of FIG. 3, viewed in the opposite direction.

FIG. 5 is a fragmentary side elevation view of a variant,

FIG. 6 is a fragmentary side elevation view, similar to FIG. 4, of this variant, and FIG. 7 is a plan view of this variant.

Figure 1:
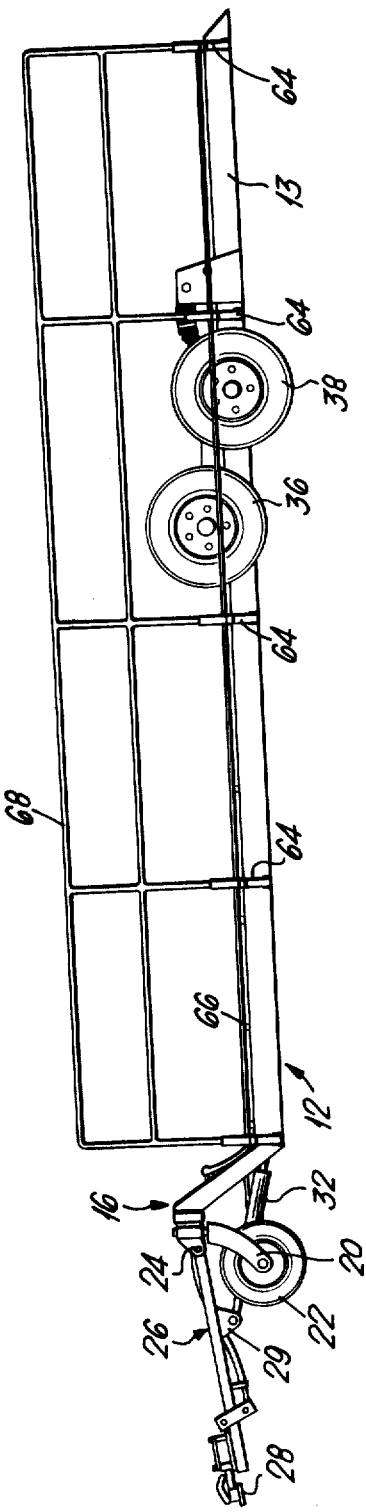
FIG. 1 is a side elevation view of a transporter embodying the invention.

Referring to the drawings, the transporter shown is in the form of a trailer having a rigid frame of welded metal construction including a generally flat rectangular platform 12 comprising two longitudinally extending horizontal, rectangular section metal beams 13 defining the sides of the trailer, transverse horizontal beams connecting the means 13, two longitudinally extending horizontal beams 15 spaced inwardly of the beams 13, the space between each beam 15 and the adjoining, parallel beam 13 being spanned by structure defining therewith a respective wheel engaging platform 14, of elongate rectangular form as viewed in plan. At the front end of the platform, a fore-part 16, rigidly connected with the platform, rises upwardly therefrom, the uppermost part of said fore-part being provided by a horizontal transverse beam 18 at either end of which is mounted, for rotation about a vertical axis, a respective forked yoke 20 supporting a respective front wheel 22 of the trailer. The arms of each yoke 20, between which the respective front wheel 22 is accommodated and between which the axle 23 of the respective front wheel extends, are inclined substantially with respect to the vertical as shown, so that, in use, a substantial castor action is provided.

Pivotally connected to the horizontal beam 18 for pivoting about a horizontal axis 24 parallel with the beam 18 is a rigid tow bar structure 26, substantially triangular in plan, carrying at its forward end, remote from the beam 18, a towing socket 28 for engagement over a standard ball-type towing attachment of the type commonly provided on cars for towing caravans or the like.

Extending between bracket 27 on a horizontal beam 30 providing the front end of the generally flat platform 12 and a bracket 29 secured to the underside of the tow-bar at a position intermediate the horizontal beam 18 and the towing socket 28 is a strut 32 of adjustable length, the strut being, for example, devised after the fashion of a bottle screw and being pivotally connected at its opposite ends to the bracket 27 on the platform and the bracket 29 respectively. The arrangement is such that with the towing socket engaged over the towing attachment at the normal height, and with the strut 32 in place, the latter can be shortened to such an extent that the front end of the platform 12 and the front wheels 22 are raised above the ground, the weight of the front end of the trailer being supported entirely by the towing bracket on the vehicle to which the trailer is connected.

On either side of the platform, two road-engaging wheels 36 and 38 are mounted on the respective beams 13, the forwardmost of these two wheels, the wheel 36, being rotatably mounted on a bracket 40 (FIGS. 3 and 4) fixed, for example by bolts 41, to the outer side of the respective beam 13 and the rearwardmost of the two wheels, wheel 38, being rotatably mounted at one end of a swinging arm the other end of which is pivotally mounted at 42 on the beam 13 affording the side of the platform, for pivoting about a horizontal transverse axis 43. The end of the swinging arm which bears the wheel 38 is also connected, via a link 44, to one end of a leaf spring 46 which is cantilevered from a support bracket 48 on the respective beam 13 in a manner described in more detail below, the arrangement being such that when the transporter is being used to transport a vehicle at speed on public roads, for example on motorways or the like, the weight of the platform and any vehicle supported thereon is transmitted to the wheels 38 via the respective leaf springs 46, so that in such conditions the rear wheels 38 of the trailer have independent resilient suspension. In the last mentioned condition of the trailer, the forward wheels are held clear of the ground as shown. Each link 44 is, of course, pivotally connected to its swinging arm and to its leaf spring.

Considering the suspension of the rear wheels in greater detail, each leaf spring is accommodated between two parallel longitudinally and vertically extending cheeks of the respective bracket, (one of which is shown partly broken away in FIG. 4), is pivotally connected with the bracket 48 at the end of the leaf spring remote from the swinging arm, and when the trailer is set in its higher position, the upper surface of each leaf spring engages, at a position intermediate the ends of the leaf spring, a removable bolt 52 extending transversely through aligned apertures in the cheeks 50 across the space between the latter. When the trailer is to be moved into a lowered position, the bolts 52 are removed, for example after jacking up the trailer temporarily or after running the forward wheels up ramps to achieve the same effect. The swinging arms 40, which are in the form of flat vertical plates running close to the respective beam 13 are then bolted, via bolt holes 55, 56 to brackets secured to the beams 13, in positions raised with respect to the platform, so that in the lowered position of the trailer, both the wheels 36 and the wheels 38 engage the road surface to bear the weight of the trailer and any vehicle loaded thereon.

In order to ensure that the wheels of a vehicle supported on the trailer may, in the lowered position of the trailer, be as close to the road surface as possible, the wheel supporting surfaces of the trailer are afforded by metal sheets 60 which are extended between the lower edges of the longitudinally extending horizontal girders 13, 15 of the trailer. It will be noted that for structural reasons, transverse girders 62 are provided in the region of the wheels 36, 38 but these, like the girders at the front and rear ends of the trailer, have their lower sides lying in substantially the same plane as the lower sides of the longitudinal girders 13, 15 these transverse girders 62 thus extending across the spaces between the longitudinal girders with their upper surfaces lying substantially in the planes of the upper surfaces of the longitudinal girders. The sheet material providing the bottoms of the side parts 14 is bent upwardly in a hump to pass over the transverse girders 62, a sloping ramp being provided on each side to allow the wheels of the vehicle to be loaded to run easily up over these transverse girders.

Along the sides of the trailer, on either side thereof, are secured at intervals sockets 64 to receive spigots provided on detachable catwalk sections 66, which may in turn be provided with sockets for detachable rails 68 or the like.

In order to illustrate the utility of the trailer described with reference to the drawings, let it be supposed that scenes including a particular vintage car are to be filmed at a location remote from that at which the car is normally stored. The trailer may be used to transport the car between these locations, over public roads, motorways or the like, and it is necessary that, in order to meet legal requirements as well as from the point of view of practical safety, the clearance between the underside of the platform and the road surface must, during such transportation, be at least five inches. This is achieved by placing the platform in a raised position in which the wheels 38 engage the read surface with the pins 52 above the leaf springs 46 extending between the cheeks 50 of the respective brackets 48 and the tow bar structure 26 fixed with respect to the platform by means of the strut 32 in a position such that the front end of the platform, supported by the towing vehicle, has the required clearance with respect to the road, the front wheels 22, in this position, being clear of the road. For convenience, the car to be transported may be rolled onto the platform with the latter in its lowered position, the platform being subsequently moved to its raised position, for example by jacking up the platform prior to dropping the wheels 38 and fitting the bolts 52 and the strut 32, or raising the platform temporarily by running the forward wheels up the ramps to allow the rearward wheels the drop before fitting the bolts 52 above the leaf spring. For transportation of course, the catwalks and rails, projecting laterally from the sides of the platform, are disconnected from the sides of the trailer. During transportation of the car, therefore, the only wheels of the trailer actually in engagement with the road, are, as required to comply with the law and as desirable from practical considerations, connected with the trailer via a resilient suspension.

When a close-up scene featuring characters seated in the car is to be filmed, however, the trailer is moved to its lowered position by removing the bolts in the brackets of the rearward wheels, so that the wheels 36 engage the road, and by removing the strut 32 so that the front wheels 22 engage the road, the swinging arms 40 being fixed in the desired position to the beams 13 by bolts as indicated previously. In this lowered position, as indicated previously, the underside of the platform is very close to the road surface, the clearance being, for example, of the order of two inches, and it is therefore impracticable to employ a resilient suspension, so that no such suspension is provided for the front wheels and the forward wheels. Since due to such factors as unevenness of the road surface, the degree of road camber etc. the minimum height of the sides of the platform above the road in the lowered position which may be safely adopted may vary from location to location, provision is made for adjusting the height of the wheels relative to the beams 13 in the lowered position. To this end, each wheel 36a is rotatably mounted on a respective plate 40 which is slidable vertically in a slot defined between the outside of the respective beam 13 and a bar 70 bent at its ends and welded to the beam, the plate 40 being provided with two vertical rows of vertically spaced apertures, so that in each of a plurality of vertical positions of the plate, a respective hole in each said vertical row can be aligned with a hole formed in a respective one of two brackets welded to the respective beam 13 and the bolts 41 passed through the aligned holes. Similar adjustment of the swinging arms 40 is also provided for, each arm 40 being, for example, provided with a series of bolt holes 55, at different positions, so that a selected hole 55 in each arm 40 can be aligned with the respective hole 56 in a bracket welded to the beam 13 and the swinging arm fixed with respect to the beam by a bolt passed through these aligned holes. The catwalks, rails, supports for cameras or other equipment etc. are then fitted on the sides of the platform, the cameras and the like appropriately positioned and filming proceeds whilst the trailer is towed along the selected stretch of road.

Figure 2:
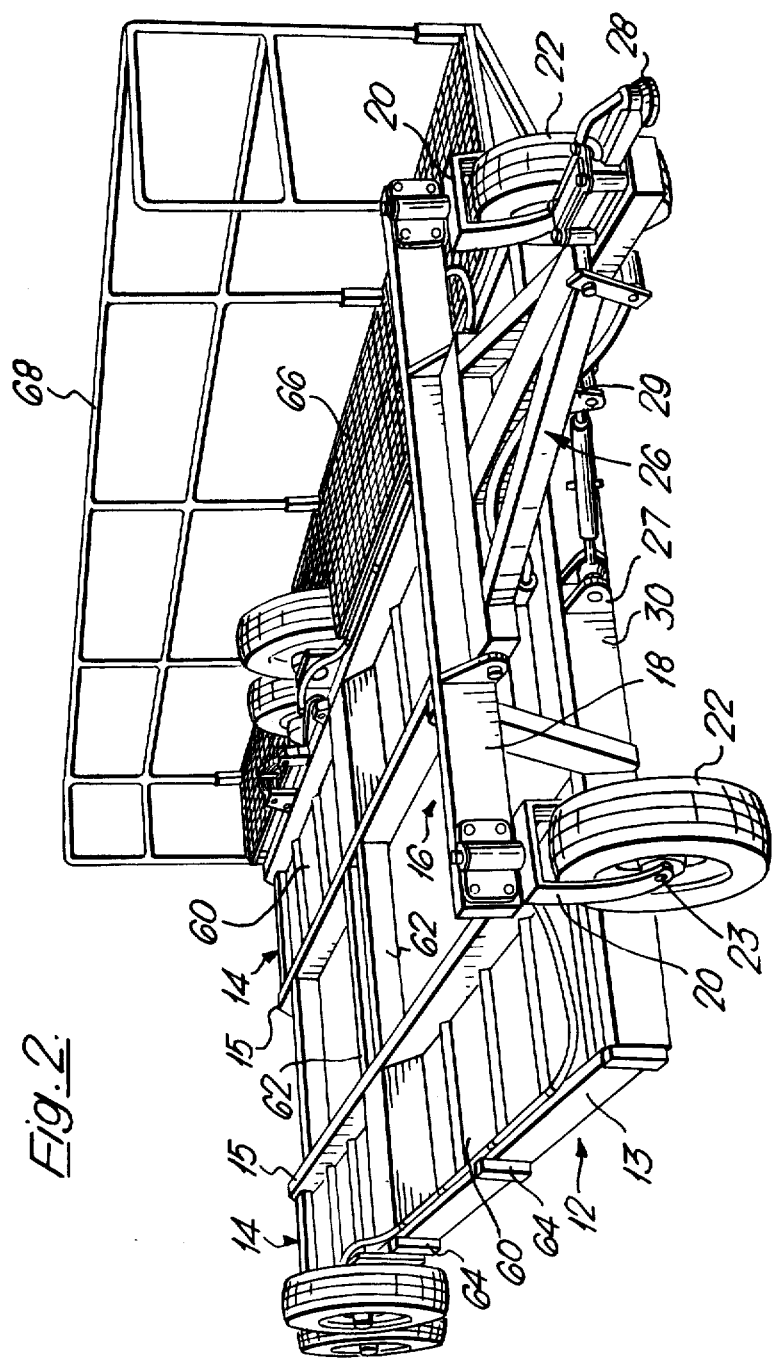
FIG. 2 is a perspective view of the transporter.

In a modification of the trailer of FIGS. 1 to 4, shown in FIGS. 5 to 7, in which like parts have like reference numerals and analogous parts have the same reference numerals as the corresponding parts in FIGS. 1 to 4 but with the suffix b, the tow bar 26b is rigidly secured to the beam 18b, which carries the front wheels 22 in castor fashion as before, but the beam 18b, instead of being rigidly secured to the trailer bed via a fore part 16, is connected thereto via two links 16b, the fore part 16 being omitted. Each link 16b slopes forwardly and upwardly from the beam 30 at the front of the trailer platform 12 and is pivotally connected at the upper end to the beam 18b and at the lower end to the beam 30, the pivotal axis of the connections between the links 16b and the beam 18b and the pivotal axis of the connections between the link 16b and the beam 30 being transverse and horizontal.

Extending downwardly from the beam 18a and fixed rigidly thereto are two arms 120 which carry, at their lower ends, a transverse horizontal beam 122. Acting between the beam 122 and the transverse beam 30 are two hydraulic piston and cylinder units 124 each pivotally connected at one end to the beam 122 and at the other end of the beam 30.

It will be appreciated that with the towing socket 28 secured to the towing fixture of a towing vehicle, the front end of the trailer platform 12 may be raised and lowered respectively by extending and contracting the hydraulic piston and cylinder units 124. The hydraulic piston and cylinder units 124 are connected, via a hydraulic line 137, with a hydraulic pump (not shown), which may be a hydraulic pump incorporated in the towing vehicle as a feature of the latter, and driven by the vehicle motor or, for example an electric motor powered by the electrical system of the towing vehicle, the line 37 being connected with the pump via a releasable connection of known type, or which may be a self-contained unit, for example incorporating its own motor or hand operated, which may be carried in the back of the towing vehicle or may be removed therefrom and, for example, placed by the trailer and operated to lift the trailer bed in relation to the wheels to allow actors to get out of a vehicle in which they have been filmed. Valve means (not shown) may be provided in the line 137 to cut off the latter from the pump or from the detachable connection therewith, so that the wheels of the trailer can be 'locked', in any desired adjusted position.

In this variant, the two wheels 36b and 38b are both continuously in use and remain at the same level as one another relative to the trailer bed, both during use of the trailer for straightforward transportation and during use of the trailer during filming. As best shown in FIGS. 6 and 7, the hub 138 of each wheel is rotatably mounted on a respective swinging arm 40b extending forwardly from the hub to meet a respective end of a respective transverse horizontal shaft 143a, 143b, to which it is secured. Thus, as shown in FIG. 7, the forward ends of the swinging arms 40b supporting the hubs of the rear wheels 38b are secured to respective ends of the transverse horizontal shaft 143b which is rotatably mounted in the trailer body and the forward end of the swinging arms 40b supporting the hubs of the more forward wheels 36b are secured to respective ends of the second transverse horizontal shaft 143a disposed forwardly of the first mentioned shaft 143b and also rotatably mounted in the trailer body. The two shafts 143a, 143b are rotationally coupled by means of two endless roller chains 126 each running around a respective sprocket 128 secured to the shaft 143b and a respective sprocket 130 secured to the shaft 143a. Thus the two shafts 143a, 143b are constrained to perform equal angular movements, and since the swinging arms 40a are of equal length and parallel with one another, the wheels 36b and 38b are constrained to remain at substantially the same level as one another.

The bar 122 is operatively connected with the shafts 143a, 143b and the sprockets 130, 128, by way of links 132, in such a way that the movement of the hydraulic piston and cylinder units 124 which is such as to raise, (and at the same time move rearwardly) the front of the trailer platform 12 by a given amount will also, via the links 132, as a consequence of the fore and aft movement of the beam 122 relative to the platform 12, bring about a corresponding rotational movement of the shafts 143a, 143b, and thus of the swinging arms 40a, such as to raise the middle of the trailer bed, via the wheels 36b, 38b by the same amount, and conversely when the front of the trailer bed is lowered by operation of the hydraulic piston and cylinder units 124, the middle of the trailer bed will similarly be lowered relative to the wheels 36b, 38b.

The links 132 preferably operate in tension and may, for example, be connected with the forwardmost shaft 143a by being pivotally connected to arms (not shown) extending radially from the forwardmost shaft 143a, or be connected to respective lengths of roller chain (not shown) engaged around further sprockets secured to the forwardmost shaft 143a, or may, more simply, be pivotally connected to respective ones of the sprockets 130. It will be appreciated that the shafts 143a, 143b, sprockets 128, 130, and links 132 lie within the confines of the upper and lower boundaries of the trailer platform 12, the shafts 43a being, for example, covered by cladding panels in the respective channels 14 to protect them from damage.

It has found desirable to minimise, as far as possible, the superstructure associated with the wheels 36, 38 (FIGS. 1 to 4) or the wheels 36b, 38b, since such superstructure may interfere with the opening of the doors of vehicles carried by the trailer. In the arrangement shown in FIGS. 5 to 7, it is possible to move the wheels 36b, 38b downwardly relative to the trailer platform 12 to such an extent that the doors of any vehicle carried by the trailer can pass above the wheels 36b, 38b. In this position, at least, the remainder of the suspension system associated with these wheels is also disposed below the upper boundary of the trailer bed, and is thus also out of the path of movement of such doors.

In order to provide, when desired, and in an economical manner, a resilient suspension system for the trailer, in the variant of FIGS. 5 to 7 a gas accumulator 136 is connected (see FIG. 5) for example via a T-junction, in the hydraulic line 137 which extends from the towing vehicle to the hydraulic cylinders 124, and an isolating tap 138 is provided whereby the hydraulic line 137 can, when desired, be isolated from the accumulator 136 when resilient suspension is not desired.

When the tap 138 is open, the volume of gas within accumulator 136, being compressible, acts as the resilient element in the suspension. In certain cases it may be desirable, in order to minimise the amount of ancillary equipment which must be carried, and also to minimise the risk that an incorrect mode of fitting may be attempted with consequent inconvenience and loss of time, to provide a catwalk and handrail arrangement 66, 68, which can be fitted, optionally, on either of the two sides of the trailer platform 12. To this end, the sockets 64 and the respective spigots on the detachable catwalk sections may be arranged identically on both sides of the trailer and symmetrically with respect to a transverse vertical plane disposed midway between the front and rear ends of the trailer platform 12. To further this end, the wheels 36, 38 or 36b, 38b, may be disposed symmetrically about this last-mentioned plane, or, if this is not the case, the arrangement may be such that a catwalk section which is recessed to accommodate the wheels 36, 38 or 36b, 38b can be readily transposed with an adjacent, non-recessed section, with the junction between these two sections lying in this plane of symmetry.

It has been found that there is a tendency if the vehicle carried by the trailer is disposed towards the rear end of the trailer, for the rear end of the trailer to drag along the road, particularly towards the middle of the trailer in the region of the beams 15, where the proximity to the road surface is increased as a result of the road camber. To counteract this the beams 13 and 15, or if preferred, only the beams 15 may be curved upwardly slightly adjacent their rear ends. This is not shown in the drawings, since the curvature is not pronounced and would not be particularly apparent in the drawings if shown.

The accumulator 136 is preferably of a type known per se in gas filled suspension systems.

If desired, the hydraulic piston and cylinder units 124 may be replaced by pneumatic piston and cylinder units with, if necessary, supplementary ties or the like by means of which an adjustment secured pneumatically may be fixed rigidly. Where a pneumatic system is utilised it may be unnecessary to provide any other resilient suspension means as the pneumatic system itself may serve this function.

We claim:

1. A vehicle transporter, providing a support structure for supporting the wheels of a vehicle to be transported, said structure comprising a platform substantially open at a rear end thereof and having two pairs of transversely spaced-apart parallel beams extending longitudinally of the vehicle, a wheel support surface member extending between each of said pairs of beams below the level of the upper surfaces of the beams, and affording a supporting surface for the wheels of the vehicle to be carried, said pairs of beams, together with corresponding surface members extending therebetween, forming a pair of parallel tracks for supporting the vehicle to be transported, said structure being mounted on road-engaging wheel means, said wheel means including wheels disposed intermediate front and rear ends of said tracks, said road-engaging wheels lying entirely on the outer sides of the outermost ones of the beams forming the two supporting tracks; and another structure at the front of said platform rising above the level of the platform, and pivotally connected with the platform by limbs pivotable with respect to the platform about a first transverse horizontal axis and pivotable with respect to said fore-structure about a second transverse horizontal axis, said fore-structure having ground-engaging wheels, and extensible and retractable means being provided connected with said platform at a point substantially on said first axis and with said fore-structure at a point spaced from said axis, whereby if the angle of said fore-structure with respect to the road surface is kept constant, the level of the front of said platform can be adjusted by adjustment of said extensible and retractable means.

2. A vehicle transporter according to claim 1 wherein said platform carries further ground-engaging wheels, means for connecting said further wheels to said platform including means for adjusting the level of said further wheels relative to said platform, said connecting means being operatively connected with said fore structure, whereby variation in relative position between said fore-structure and the front of the platform upon extension or retraction of said extensible and retractable means is automatically accompanied by a corresponding variation in the level of said further ground engaging wheels relative to said platform, adjustment of said extensible and retractable means thereby adjusting the level of said platform relative to the road surface while maintaining said platform parallel with the road surface.

3. A vehicle transporter according to claim 2 wherein said further ground-engaging wheels include at least two wheels, disposed on opposite sides of said platform, and rotatably mounted at free ends of respective swinging arms fixed at their other ends to respective ends of a common transverse horizontal shaft rotatably journalled in the platform, and linkage means between said shaft and said fore-structure, whereby movement of said fore-structure relative to the platform as a consequence of adjustment of said extensible and retractable means causes corresponding rotation of said shaft and hence raising or lowering of said further wheels relative to said platform.

4. A vehicle transporter according to claim 1 wherein said support structure includes along at least one longitudinal side thereof, an auxiliary supporting structure projecting laterally outwardly from said longitudinal side and non-coextensive with a corresponding supporting track, and means for detachably securing said auxiliary supporting structure to said support frame.

5. A vehicle transporter according to claim 1 wherein said wheel support means comprises sheet material extending between said beams in the plane of the undersides of the beams.

6. The vehicle transporter of claim 1 including means for selectively supporting the support structure at a higher level, for transportation, or at a lower level, such that the wheel supporting surface for the vehicle being transported is spaced relatively closely to the surface of the road engaged by the wheels of the transporter itself.

* * * * *